United States Patent
Casagrande et al.

(10) Patent No.: US 11,780,949 B2
(45) Date of Patent: Oct. 10, 2023

(54) LOW DENSITY, LOW COMPRESSION SET, LONG RECOVERY TIME POLYURETHANE FOAM

(71) Applicant: Dow Global Technologies LLC, Midland, MI (US)

(72) Inventors: Gianluca Casagrande, Correggio (IT); Federico La Terra, Correggio (IT); Antonio Papa, Correggio (IT)

(73) Assignee: Dow Global Technologies LLC, Midland, MI (US)

( * ) Notice: Subject to any disclaimer, the term of this patent is extended or adjusted under 35 U.S.C. 154(b) by 158 days.

(21) Appl. No.: 17/608,593

(22) PCT Filed: Apr. 20, 2020

(86) PCT No.: PCT/US2020/028915
§ 371 (c)(1),
(2) Date: Nov. 3, 2021

(87) PCT Pub. No.: WO2020/231602
PCT Pub. Date: Nov. 19, 2020

(65) Prior Publication Data
US 2022/0204678 A1    Jun. 30, 2022

(30) Foreign Application Priority Data

May 13, 2019   (IT) .......................... 102019000006775

(51) Int. Cl.
*C08G 18/08*   (2006.01)
*C08G 18/10*   (2006.01)
*C08G 18/12*   (2006.01)
*C08G 18/18*   (2006.01)
*C08G 18/30*   (2006.01)
*C08G 18/48*   (2006.01)
*C08G 18/76*   (2006.01)
*C08G 101/00*  (2006.01)

(52) U.S. Cl.
CPC ............. *C08G 18/14* (2013.01); *C08G 18/12* (2013.01); *C08G 18/1833* (2013.01); *C08G 18/302* (2013.01); *C08G 18/4804* (2013.01); *C08G 18/4837* (2013.01); *C08G 2101/00* (2013.01); *C08G 2110/005* (2021.01); *C08G 2110/0008* (2021.01)

(58) Field of Classification Search
CPC ............ C08G 18/4804; C08G 18/4833; C08G 18/4845
See application file for complete search history.

(56) References Cited

U.S. PATENT DOCUMENTS

| | | | |
|---|---|---|---|
| 9,133,298 B2 | 9/2015 | Hager et al. | |
| 9,441,068 B2 | 9/2016 | Corinti | |
| 2006/0084710 A1* | 4/2006 | Meyer-Ahrens ... | C08G 18/4845 521/131 |
| 2020/0157273 A1* | 5/2020 | Otero Martinez . | C08G 18/7671 |

FOREIGN PATENT DOCUMENTS

WO   2013/184527 A   12/2013

* cited by examiner

*Primary Examiner* — Melissa A Rioja

(57) ABSTRACT

Flexible polyurethane foams are characterized in having slow recovery times, low foam densities and very low compression sets. The foams are useful in human comfort applications such as pillows and mattresses.

12 Claims, No Drawings

LOW DENSITY, LOW COMPRESSION SET, LONG RECOVERY TIME POLYURETHANE FOAM

This invention relates to polyurethane foam characterized in having a low density, low compression set and prolonged recovery time.

A fast-growing segment of the polyurethane foam industry is the so-called "viscoelastic" foam. These foams are characterized in having low resiliency and by recovering slowly when a compressive force is released. These characteristics are perceived as very desirable in many human cushioning applications such as bedding. Products such as mattresses and pillows are increasingly being made from viscoelastic polyurethane foam.

To avoid shipping and warehousing large volumes of air, these products are usually packaged in compressed form. The consumer removes the product from its packaging to allow the foam to re-expand to approximately its original dimensions. A requirement of the foam, therefore, is that it is capable of being compressed to a small fraction of its original volume, yet is able to re-expand when the compressive force is removed even after it has been so compressed for a substantial period of time. This attribute is measured using the compression set test of ISO 1856 Method A. The compression set should be as low as possible so the foam can be packaged in highly compressed form yet is able to re-expand fully or nearly so. In addition, the foam needs to retain its properties even after being compressed repeatedly during use.

Satisfactorily low compression sets can be achieved at core foam densities of about 35 kg/m$^3$ or greater, but are difficult to obtain in slow-recovering foams at lower foam densities, such as 32 kg/m$^3$ or lower and especially 28 kg/m$^3$ or lower, particularly when the polyisocyanate is MDI or based on MDI and the foam is blown primarily or solely with water. These very low foam densities are usually produced by increasing the amount of water in the foam formulation, thus resulting in more urea linkages in the polymer structure. The presence of large proportions of urea linkages is known to increase compression set. Lower densities are also associated with poorer properties, including poorer compression set.

U.S. Pat. No. 9,441,068 describes slow-recovering foams made using a large proportion of a 1300-1700 equivalent weight polyether polyol that contains 80 to 95% primary hydroxyl groups and in which the oxyethylene units constitutes 75 to 95% of the total weight of oxyethylene and oxypropylene units combined. The selection of this polyol is reported to lead to a desirable set of surface haptic properties. Examples report formulations containing 3.1 to 3.35 parts water, producing foams having densities in the range of 44 to 46 kg/m$^3$.

WO 2013/182527 describes slow-recovering foams made using as the main polyol one having an equivalent weight of about 1516, an oxyethylene content of 71.1 mole-% (about 65 weight percent) and about 83% primary hydroxyl groups. Specific embodiments are shown in which the water level is 3.5% by weight of the polyol side of the formulation. No physical properties of the foams are reported What is desired is a slow-recovering, low resiliency polyurethane foam that has a core density of at most 33 kg/m$^3$ and a 90% compression set of at most 10%, as measured according to ISO 1856 Method A. The foam preferably has desirable surface haptic properties, particularly a highly smooth surface. A method for making such a foam is also desired.

This invention is in one aspect a flexible polyurethane foam characterized by having a) a core foam density of 20 to 33 kg/m$^3$, b) a 90% compression set of no greater than 10% as measured according to ISO 1856 method A, and a recovery time of 0.5 to 20 seconds, measured as described below.

The flexible foam of the invention is obtainable by reacting a reaction mixture that comprises:

a) an aromatic polyisocyanate having an isocyanate content of 20 to 33% by weight, in an amount to produce an isocyanate index is 50 to 90 and b) polyethers comprising i) at least one polyether having a hydroxyl equivalent weight of 500 to 2000, a nominal hydroxyl functionality of 1 to 4 and an oxyethylene content of 40 to 95% by weight, wherein at least 60% of the hydroxyl groups are primary; and ii) at least one homopolymer or copolymer of propylene oxide, the homopolymer or copolymer of propylene oxide having a hydroxyl equivalent weight of 80 to 2000 and a nominal hydroxyl functionality of 1 to 6, and wherein at least 80% of the hydroxyl groups are secondary; wherein polyether ii) is present in an amount such that it is at least partially incompatible with polyether i).

c) water in an amount of 4.5 to 6.5 weight percent, based on the combined weight of components b)-f), d) at least one catalyst for the reaction of an isocyanate group with an alcohol and/or water and e) at least one silicone foam-stabilizing surfactant, f) 0 to 25 weight percent, based on the combined weights of components b)-f), of isocyanate-reactive compounds different than components b), c), d) and e), provided that the reaction mixture contains no more than 5 weight percent, based on the combined weight of components b)-f), of ethylene oxide-capped polypropylene oxide) polyols having an oxyethylene content of up to 30% based on the weight of the ethylene oxide-capped polypropylene oxide) polyol.

In addition, the flexible foam of the invention is obtainable by reacting a reaction mixture that comprises:

a) an aromatic polyisocyanate having an isocyanate content of 20 to 33% by weight, in an amount to produce an isocyanate index is 50 to 90 and b) polyethers comprising b-1) at least one polyether having a hydroxyl equivalent weight of 500 to 2000, a nominal hydroxyl functionality of 1 to 4 and an oxyethylene content of 40 to 95% by weight, wherein at least 60% of the hydroxyl groups are primary;

b-2) at least one homopolymer or copolymer of propylene oxide, the homopolymer or copolymer of propylene oxide having a hydroxyl equivalent weight of 600 to 2000 and a nominal hydroxyl functionality of 1 to 6, and wherein at least 80% of the hydroxyl groups are secondary; and b-3) optionally at least one homopolymer or copolymer of propylene oxide, the homopolymer or copolymer of propylene oxide having a hydroxyl equivalent weight of 80 to 599 and a nominal hydroxyl functionality of 1 to 6, and wherein at least 80% of the hydroxyl groups are secondary, wherein i) the ratio of hydroxyl equivalents provided by component b-1) to the hydroxyl equivalents provided by components b-2) and b-3) combined is 1 to 2.5, ii) component b-1 constitutes 65 to 85 weight percent of the combined weights of components b)-f); iii) component b-2) constitutes 1 to 30 weight percent of the combined weights of components b)-f), iii) component b-3) constitutes 0 to 20 weight percent of the combined weights of components b)-f), and iv) the combined weight of components b-1), b-2) and b-3) constitute at least 70% of the combined weight of components b)-f);

c) water in an amount of 4.5 to 6.5 weight percent, based on the combined weight of components b)-f), d) at least one catalyst for the reaction of an isocyanate group with an alcohol and/or water and e) at least one silicone foam-stabilizing surfactant, f) 0 to 25 weight percent, based on the combined weights of components b)-f), of isocyanate-reactive compounds different than components b), c), d) and e), provided that the reaction mixture contains no more than 5 weight percent, based on the combined weight of components b)-f), of ethylene oxide-capped polypropylene oxide) polyols having an oxyethylene content of up to 30% based on the weight of the ethylene oxide-capped polypropylene oxide) polyol.

The ability to achieve the combination of slow recovery time, very low foam density and very low compression set even after 90% compression is quite unexpected, very beneficial, and believed to be previously unknown, particularly in foams blown using such high amounts of water. Foam of the invention, having such a combination of properties, is useful as pillows and other bedding and human cushioning applications, for which they have very desirable haptic properties. The low density contributes greatly to those desirable haptic properties while providing the additional benefit of reducing raw material costs.

The extremely low compression sets permit the foams to be packaged, warehoused and transported in a highly compressed state. After being removed from their packaging, the foams recover to nearly their original dimensions. There is little permanent distortion. Similarly, the foams resist permanent distortion even after being compressed repeatedly during their normal usage (such as due to the applied weight of a human body or portion thereof).

The aromatic polyisocyanate is a single material or a mixture of isocyanate compounds that has an isocyanate content of 20 to 33% by weight and an average of at least two isocyanate groups per molecule. In some embodiments the isocyanate content is at least 25%, at least 27% or at least 28% and up to 31% or up to 30% by weight. The aromatic polyisocyanate in some embodiments has an average of up to 3, up to 2.7, up to 2.5 or up to 2.2 isocyanate groups per molecule.

Examples of useful aromatic polyisocyanates include m-phenylene diisocyanate, toluene-2,4-diisocyanate, toluene-2,6-diisocyanate, naphthylene-1,5-diisocyanate, methoxyphenyl-2,4-diisocyanate, diphenylmethane-4,4'-diisocyanate, diphenylmethane-2,4'-diisocyanate, diphenylmethane-2,2'-diisocyanate, 4,4'-biphenylene diisocyanate, 3,3'-dimethoxy-4,4'-biphenyl diisocyanate, 3,3'-dimethyl-4-4'-biphenyl diisocyanate, 3,3'-dimethyldiphenyl methane-4, 4'-diisocyanate, 4,4',4''-triphenyl methane triisocyanate, a polymethylene polyphenylisocyanate (PMDI) having 3 or more phenyl isocyanate groups, toluene-2,4,6-triisocyanate and 4,4'-dimethyldiphenylmethane-2,2',5, 5'-tetraisocyanate. Any of the foregoing aromatic isocyanates may be modified to contain one or more urethane, urea, allophanate, biuret, carbodiimide or uretonimine linkages or any combination of any two or more thereof.

Preferably the polyisocyanate is diphenylmethane-4,4'-diisocyanate, diphenylmethane-2,4'-diisocyanate, diphenylmethane-2,2'-diisocyanate, PMDI, or mixtures of any two or more thereof. Diphenylmethane-4,4'-diisocyanate, diphenylmethane-2,4'-diisocyanate and diphenylmethane-2,2'-diisocyanate and mixtures thereof are generically referred to as MDI, and all can be used. "Polymeric MDI", which is a mixture of PMDI and MDI, can be used, in particular a polymeric MDI that contains at most 70% by weight MDI, especially 50 to 70% by weight MDI.

In some embodiments, the polyisocyanate is or includes an MDI product that contains up to 50 weight percent, preferably up to 30 weight percent, of the 2,4'-isomer and up to 5 weight percent of the 2,2'-isomer (the remainder being the 4,4'-isomer), and/or a mixture thereof with PMDI, in each case having an isocyanate content and average isocyanate functionality as described herein.

Another useful organic polyisocyanate is or includes a urethane group-containing prepolymer made in the reaction of one or more of the foregoing aromatic isocyanates (particularly one as described in the foregoing paragraph) with a monoalcohol or polyol, the prepolymer having an isocyanate content and functionality as described above. The monoalcohol or polyol has one or more hydroxyl groups, especially 2 to 4 or 2 to 3 hydroxyl groups, and may have a hydroxyl equivalent weight of 30 to 2500. A particularly preferred polyol for making the prepolymer is a polyether polyol having a hydroxyl equivalent weight of 500 to 2000, especially 1000 to 2000 or 1250 to 1750, and 2 to 4, especially 2 to 3, hydroxyl groups per molecule. Such a polyether polyol may be, for example, a homopolymer of ethylene oxide or propylene oxide, a copolymer (random and/or block) of ethylene oxide and propylene oxide, or a poly(tetramethylene glycol).

The aromatic isocyanate is provided in an amount sufficient to produce an isocyanate index of 50 to 90, preferably 60 to 90 or 60 to 75.

The aromatic isocyanate is reacted with one or more polyethers (component b)) and water to produce the foam of the invention.

The polyethers b) include at least one polyether b-1) having a hydroxyl equivalent weight of 500 to 2000, a nominal hydroxyl functionality of 1 to 4, preferably 2 to 3 and an oxyethylene content of 40 to 95% by weight (based on the total weight of the component i) polyether), wherein at least 60%, preferably at least 80%, at least 85% or at least 88% of the hydroxyl groups are primary. The hydroxyl equivalent weight may be at least 1200 or at least 1300 and may be up to 1800 or up to 1700 in specific embodiments. In specific embodiments, up to 95% or up to 90% of the hydroxyl groups may be primary. In specific embodiments, the oxyethylene content of each component i) polyether may be at least 40%, at least 50% or at least 70% and, for example, may be up to 93%, up to 90%, up to 85% or up to 80%.

Component b-1) preferably is a copolymer of ethylene oxide and propylene oxide. In especially preferred embodiments, component i) is a random copolymer made by polymerizing a mixture of ethylene oxide and propylene oxide onto an initiator compound (or mixture of initiator compounds). Such a random copolymer may have poly (oxyethylene) end-caps formed by homopolymerizing ethylene oxide onto the end of the randomly polymerized ethylene oxide/propylene oxide chains.

Component b-2) of polyether mixture b) is at least one homopolymer or copolymer of propylene oxide that has a hydroxyl equivalent weight of 600 to 2000. The hydroxyl equivalent weight of component b-2) in some embodiments is up at least 700, at least 750, at least 800 or at least 900 and in some embodiments is up to 1500 or up to 1250. Component b-2) may have a nominal hydroxyl functionality of 1 to 6 or 1 to 3, with a nominal functionality of 2 to 3 being preferred.

At least 80% of the hydroxyl groups of component b-2) are secondary. In some embodiments, at least 90% of the hydroxyl groups are secondary.

Optional component b-3) of polyether mixture b) is at least one homopolymer or copolymer of propylene oxide that has a hydroxyl equivalent weight of 80 to 599. In some embodiments the hydroxyl equivalent weight of component b-3) is at least 100, at least 125, at least 150, at least 175 or at least 190 and in some embodiments the hydroxyl equivalent weight is up to 550 or up to 500. Component b-3) may have a nominal hydroxyl functionality of 1 to 6 or 1 to 3, preferably 2 to 3. At least 80%, preferably at least 90% of the hydroxyl groups of component b-3) are secondary.

Component b-2) and component b-3) (when present) each preferably is a homopolymer of propylene oxide or a copolymer of propylene oxide and ethylene oxide which contains no more than 20 wt.-%, preferably no more than 10 wt.-%, or no more than 5 wt.-% oxyethylene groups.

In some embodiments, the polyethers b) include at least one polyether b-2) and at least one polyether b-3).

Each of components b-1) and b-2) preferably does not contain primary, secondary amine groups and more preferably also do not contain tertiary amine groups. Furthermore, each of components b-1), b-2) and b-3) lack siloxane groups.

Components b-1), b-2) and b-3) (when present) are present in relative amounts such that the ratio of hydroxyl equivalents provided by component b-1) to the hydroxyl equivalents provided by components b-2) and b-3 is 1 to 2.5 1.5 to 1.75. This ratio may be at least 1.5 or at least 1.55 or at least 1.58 and may be up to 2.25, up to 2.0, up to 1.75, up to 1.70, up to 1.68 or up to 1.65 in specific embodiments.

Furthermore, component b-1) constitutes 65 to 85 weight percent of the combined weights of components b)-f). In some embodiments, component b-1) may constitute up to 80% or up to 82%, up to 80% or up to 78% of the combined weights of components b)-f).

Component b-2) constitutes 1 to 30 weight percent of the combined weights of components b)-f). In some embodiments, component b-2) constitutes at least 5, at least 6, at least 8, at least 10 weight percent of the combined weights of components b)-f) and in some embodiments may constitute up to 28, up to 25, up to 20 or up to 18 weight percent thereof.

Component b-3) may constitute 0 to 20 weight percent of the combined weights of components b)-f). When present, component b-3) may constitute at least 1, at least 2.5 or at least 5 weight percent of the combined weights of components b)-f). In some embodiments component b-3) constitutes up to 18, up to 15 or up to 12.5 weight percent of the combined weights of components b)-f).

Components b-2) and b-3) together may constitute up to 30 weight percent of the combined weights of component b)-f).

The combined weight of components b-1), b-2) and b-3) constitute at least 75% of the combined weight of components b)-f) and preferably at least 80%, at least 85%, at least 90%, at least 93% thereof or at least 93.5% thereof.

Component c) is water, which is present in an amount from 4.5 to 6.5 percent of the combined weights of components b)-f). In some embodiments water may constitute at least 4.75 or at least 4.9 weight percent of the combined weights of components b)-f) and in some embodiments may constitute up to 6.0, up to 5.75 or up to 5.5 weight percent thereof.

Component d) is at least one urethane catalyst, i.e., a catalyst for the reaction of an isocyanate group with an alcohol and/or water. The urethane catalyst catalyzes either or both of the water-isocyanate reaction and the alcohol-isocyanate reaction, and is not a polyether corresponding to any of components b-1), b-2) or b-3). Suitable catalysts include, for example, tertiary amines, cyclic amidines, tertiary phosphines, various metal chelates, acid metal salts, strong bases, various metal alcoholates and phenolates and metal salts of organic acids. Examples of metal-containing catalysts are tin, bismuth, cobalt and zinc salts. Catalysts of most importance are tertiary amine catalysts, cyclic amidines, zinc catalysts and tin catalysts. Examples of tertiary amine catalysts include: trimethylamine, triethylamine, N-methylmorpholine, N-ethylmorpholine, N,N-dimethylbenzylamine, N,N-dimethylethanolamine, N,N,N', N'-tetramethyl-1,4-butanediamine, N,N-dimethylpiperazine, 1,4-diazobicyclo-2,2,2-octane, bis(dimethylaminoethyl)ether, triethylenediamine and dimethylalkylamines where the alkyl group contains from 4 to 18 carbon atoms. Mixtures of these tertiary amine catalysts are often used.

A reactive amine catalyst, such as DMEA (dimethylethanolamine) or DMAPA (dimethylaminopropyl amine), or an amine-initiated polyol different from components b-1), b-2) and b-3) may also be used.

Tin catalysts include stannic chloride, stannous chloride, stannous octoate, stannous oleate, dimethyltin dilaurate, dibutyltin dilaurate, tin ricinoleate, other tin compounds of the formula $SnR_n(OR)_{4-n}$, wherein R is alkyl or aryl and n is 0 to 4, dialkyl tin mercaptides, dialkyl tin thioglycolates and the like. Tin carboxylates in which the carboxylate group has 6 to 18 carbon atoms are sometimes associated with lower VOCs in the VE foam. Zinc and tin catalysts are generally used in conjunction with one or more tertiary amine catalysts, if used at all.

Catalysts are typically used in small amounts, the amount of all catalysts combined suitably constituting 0.0015 to 4.5 percent of the total weight of components b)-f). A preferred amount is up to 2 percent, up to 1.5 percent or up to 1.0 percent, on the same basis. Zinc and tin catalysts are generally used in very small amounts within this range, such as from 0.0015 to 0.25 weight percent on the same basis.

The reaction mixture further comprises e) at least one silicone foam-stabilizing surfactant. The foam-stabilizing surfactant is a material that helps stabilize the gas bubbles formed by the blowing agent during the foaming process until the polymer has cured. A wide variety of silicone surfactants as are commonly used in making polyurethane foams can be used in the formulated polyol composition of this invention. The silicone surfactant may include polyether chains such as poly(ethylene oxide), polypropylene oxide) or random or block chains of copolymerized ethylene oxide and propylene oxide. Examples of such silicone surfactants are commercially available under the trade names Tegostab™ (Evonik Industries AG), Niax™ (Momentive Performance Materials), Dabco™ (Air Products and Chemicals) and VORASURF® (The Dow Chemical Company).

The silicone foam-stabilizing surfactant may constitute, for example, 0.01 to 2.5 weight percent of the combined weights of components b)-f), a preferred amount being at least 0.05 weight percent or at least 0.1 weight percent and up to 1 weight percent, up to 0.5 weight percent or up to 0.25 weight percent, on the same basis.

The reaction mixture may contain f) 0 to 25 weight percent, based on the combined weights of components b)-f), of isocyanate-reactive compounds different than components b), c), d) and e). A preferred amount is up to 20, up to 15 or up to 10 weight percent on the same basis, if component f) is present at all. Monoalcohol impurities formed in the production of components b-1), b-2) and b-3) are, for purposes of this invention, considered as part of components b-1), b-2) and b-3), respectively, and the weights of such monoalcohol impurities are included within the weight of those respective components.

Among the optional isocyanate reactive components are one or more monoalcohols or polyols, different from components b)-e). Examples of such other monoalcohols or polyols include compounds having a hydroxyl equivalent weight of 30 to 79 and 2 to 6 hydroxyl groups per molecule. Among such polyols are propylene glycol, dipropylene glycol, tripropylene glycol, 1,3-propanediol, 1,4-butanediol, 1,5-pentanediol, 1,6-hexanediol, 2-methyl-1,3-propanediol, glycerin, trimethylolpropane, trimethylolethane, pentaerythritol, erythritol, triethanolamine, diethanolamine, mannitol, sucrose, sorbitol and the like. Other optional polyols include polyether polyols that have a hydroxyl equivalent weight in excess of 2000, polyester polyols and one or more natural oil polyols such as castor oil, "blown" soybean oil and the like.

Component f) may include monoalcohols (monols, i.e., compounds having exactly one hydroxyl group per molecule) that have hydroxyl equivalent weights of up to 79 or greater than 2000. Such a monol may be a polyether, such as a homopolymer of propylene oxide, a homopolymer of ethylene oxide, or a random and/or block copolymer of propylene oxide and ethylene oxide.

Still other examples of component f) materials are primary or secondary amine compounds such as phenylene diamine, diethyltoluene diamine, ethylene diamine, diethylene triamine, aminated polyethers and the like, as well as alkanolamines such as, for example, monoethanolamine, diethanolamine, triethanolamine, monoisopropanolamine, diisopropanolamine and triisopropanolamine. However, these amine and alkanolamine compounds, if used at all, preferably are used in very small quantities, such as up to 2 weight percent, preferably up to 1 weight percent, up to 0.5 weight percent or up to 0.25 weight percent, based on the combined weights of components b)-f).

The component f) materials are optional and may be omitted. In particular, the reaction mixture contains no more than 5 weight percent, no more than 2 weight percent, no more than 1 weight percent or no more than 0.5 weight percent of ethylene oxide-capped polypropylene oxide) polyols having an oxyethylene content of up to 30% based on the weight of the ethylene oxide-capped polypropylene oxide) polyol.

In particular embodiments, the reaction mixture also has one or more of the following features, in each case the weight percentages being based on total weight of components b)-f):

i) no more than 5 weight percent, no more than 3 weight percent, no more than 2 weight percent, no more than 1 weight percent or no more than 0.5 weight percent of compounds having one or more primary and/or secondary amine groups;

ii) no more than 15 weight percent, no more than 10 weight percent, no more than 8 weight percent or no more than 5 weight percent of a polyether polyol having an oxyethylene content of 50% or greater and in which fewer than 40% of the hydroxyl groups are primary;

iii) no more than 5 weight percent, no more than 3 weight percent, no more than 2 weight percent, no more than 1 weight percent or no more than 0.5 weight percent of polyols and alkanolamines having hydroxyl equivalent weights of 149 or less and iv) no more than 5 weight percent, no more than 3 weight percent, no more than 2 weight percent or no more than 1 weight percent of any isocyanate-reactive materials different from components b)-e);

In some embodiments, the reaction mixture consists of components a), b-1), b-2), c), d) and e) and in other embodiments, the reaction mixture consists of components a), b-1), b-2), b-3), c), d) and e), in each case in proportions as stated before.

In addition, any of the embodiments described before, the reaction mixture may contain less than 0.5 weight percent, less than 0.25 weight percent or less than 0.1 weight percent of urea ($NH_2CONH_2$).

The isocyanate index is 100 times the ratio of the number of equivalents of isocyanate groups provided by component a) to the total number of equivalents of isocyanate-reactive groups provided by components b), c) and f) (if present). Water is considered as having two isocyanate-reactive groups for purposes of calculating isocyanate index, and any primary amino group is considered as only one isocyanate-reactive group.

The reaction mixture may include one or more optional ingredients in addition to those described already.

The reaction mixture (or any constituent thereof) may contain dispersed polymer particles. The dispersed polymer particles may be, for example, polyurea, polyurethane, and/or polyhydrazide, or a polymer of one or more vinyl monomers. Useful vinyl monomers include, for example, various polyolefins (such as polymers and copolymers of ethylene), various polyesters, various polyamides, various polycarbonates, various polymers and copolymers of acrylic and/or methacrylic esters, a homopolymer or copolymer of styrene, a homopolymer or copolymer of acrylonitrile and the like. In some embodiments, the dispersed particles are styrene-acrylonitrile copolymer particles.

The dispersed polymer particles in some embodiments have particle sizes from 100 nm to 25 µm, more typically from 250 nm to 10 µm as measured by laser diffraction methods, using equipment such as a Beckman-Coulter LX 13320 laser diffraction particle size analyzer.

It may be desirable to include an auxiliary blowing agent in the reaction mixture. Such auxiliary blowing agents include physical (endothermic) blowing agents such as various low-boiling chlorofluorocarbons, fluorocarbons, hydrocarbons and the like, as well as chemical (exothermic) blowing agents (other than water) that decompose or react under the conditions of the polyurethane-forming reaction. In addition, a gas such as carbon dioxide, air, nitrogen or argon may be used as an auxiliary blowing agent in a frothing process. Carbon dioxide can also be used as a liquid or as a supercritical fluid.

In addition to the foregoing components, the reaction mixture may contain fillers such as melamine and calcium carbonate; pigments and/or colorants such as titanium dioxide, iron oxide, chromium oxide, azo/diazo dyes, phthalocyanines, dioxazines and carbon black; reinforcing agents such as fiber glass, carbon fibers, flaked glass, mica, talc and the like; flame retardants; biocides; preservatives; antioxidants; plasticizers, paraffin oil, plant or animal oils or fats, epoxidized vegetable oils and/or animal fats, wax particles, gel particles and the like.

Foam is prepared by forming a reaction mixture containing components a)-e), component f) when used, and any other optional ingredients as may be desired, and allowing the reaction mixture to cure to produce the foam.

If desired, all ingredients except the polyisocyanate may be formulated into a formulated polyol composition which is subsequently combined with the aromatic polyisocyanate to form the reaction mixture that reacts to produce the foam. Alternatively, the various ingredients can all be combined at once or in any other arbitrary order, it being generally preferred to add the aromatic polyisocyanate last or at the same time as the other ingredients are combined. Ingredients b)-f) may be formed into various subcombinations that are subsequently combined with the other ingredients to produce the reaction mixture.

The reaction mixture is then foamed and cured. The process of this invention requires no special operating conditions; therefore, processing conditions and equipment described in the art for making flexible polyurethane foam are entirely suitable. In general, the isocyanate compounds will react spontaneously with water and the polyols b) even at room temperature (22° C.) in the presence of the urethane catalyst. If necessary, heat can be applied to the reaction mixture to speed the curing reaction. This can be done by heating some or all of the ingredients prior to combining them, by applying heat to the reaction mixture, or some combination of each. This heating can be at least partially due to the exothermic heat of reaction that is released as the reaction mixture cures.

Curing is continued until the reaction mixture has expanded and cured sufficiently to form a stable foam.

In some embodiments, the curing step is performed in a closed mold. In such a process, the reaction mixture is either formed in the mold itself or formed outside the mold and then injected into the mold, where it cures. The expansion of the reaction mixture as it cures is therefore constrained by the internal surfaces of the mold, as are the size and geometry of the molded part.

In a preferred molding process, the mold is maintained during the curing step at a temperature of 60° C. or lower, preferably 50° C. or lower. The lower mold temperatures favor the formation of an attached skin, i.e. a compact exterior surface which is mainly non-cellular. Such an attached skin often imparts desirable haptic properties to the foam. These haptic properties are especially beneficial when the foam is to be used in human cushioning applications such as pillows and bedding.

In a molding process, the amount of reaction mixture charged to the mold is such that a foam having a core density as described below is produced.

In other embodiments, the curing step is performed in a free-rise (or slabstock) process. In the free-rise process, the reaction mixture is poured into an open container such that expansion in at least one direction (usually the vertical direction) occurs against the atmosphere or a lightweight surface (such as a film) that provides negligible resistance to the expansion of the foam. In the free-rise process, the reaction mixture expands in at least one direction essentially unconstrained except by its own weight. The free-rise process may be performed by forming the reaction mixture and dispensing it into a trough or onto a conveyor where it expands and cures.

The flexible polyurethane foam obtained in this process is characterized in having a certain combination of core foam density, 90% compression set, resiliency and recovery time.

The core foam density (measured according to ISO 845 after removal of densified skin) is 20 kg/m$^3$ to as much as 33 kg/m$^3$. In some embodiments the core foam density is at least 22 kg/m$^3$ or at least 24 kg/m$^3$. The core foam density in some embodiments is up to 32 kg/m$^3$, up to 30 kg/m$^3$, up to 29 kg/m$^3$, up to 28 kg/m$^3$, up to 26 kg/m$^3$ or up to 25 kg/m$^3$. The ability to produce such low density foams which still have the excellent compression set behavior as well as good viscoelastic properties is highly surprising and a significant advantage of this invention.

Foam of the invention has a 90% compression set of at most 10%, as measured according to ISO 1856 Method A. 90% compression set is measured on that test by compressing the foam sample by 90%, i.e., to 10% of its original thickness.

Foam of the invention preferably has a resiliency of less than 20%, less than 15%, or less than 10%, as measured by ASTM D-3574.

Foam of the invention has a recovery time of, for example at least 0.5 second, at least 1 second, at least 1.5 seconds or at least 2 seconds, and up to 20 seconds, up to 10 seconds, up to 8 seconds or up to 5 seconds. Recovery time is measured by compressing a foam. A test specimen with a size of 4 in×4 in×2 in (10.16 cm×10.16 cm×5.08 cm), with any skin removed, is compressed to 25% of its initial thickness, and held under compression for 100 seconds. The compressive force is then released and the time required for the foam to re-attain 90% of its original thickness is measured as the recovery time. A suitable apparatus for performing recovery time measurements is a RESIMAT 150 Viscoelastic Foam Testing device (Format Messtechnik GmbH, Germany).

The foam of the invention may exhibit a 40% compression load deflection of at least 0.3 as measured by ISO 3386-1, without precompression and taking the measurements on the first cycle.

The flexible polyurethane foam may meet one or more FR (Flame Resistance) standards, such as British Standard flammability test (BS 5852—ignition source 5) using a wooden assembly (referred to as a crib) as a source of ignition.

The foam of the invention is useful in cushioning applications such as pillows, mattresses, backrests (for bed headboards, seating, etc.), automotive arm rests, seat cushions for home and/or vehicular seating, packaging, protective cushioning, and the like. It can be used as, or as a component of, sound and/or vibration (i.e., NVH) damping measures. For example, it is useful in acoustic applications to reduce noise, vibration and/or harshness, for earplugs, as well as other applications in which previous slow-recovering polyurethane foams are useful. It is useful in other applications where slow recovery after foam compression is wanted. In general, the slow-recovering foam of the invention can be used in the same applications and in the same manner as conventionally-produced slow-recovering foam.

The following examples are provided to illustrate the invention, but are not intended to limit the scope thereof. All parts and percentages are by weight unless otherwise indicated. All molecular weights are number averages by gel permeation chromatography.

Polyol b-1) is a 1500 equivalent weight, nominally trifunctional random copolymer of about 72% ethylene oxide and about 28% propylene oxide. 80-90% of its hydroxyl groups are primary.

Polyol b-2) is a 2030 number average molecular weight, nominally difunctional poly(propylene oxide). Greater than 90% of its hydroxyl groups are secondary.

Polyol b-3a) is a 1020 number average molecular weight, nominally difunctional poly(propylene oxide). Greater than 90% of its hydroxyl groups are secondary.

Polyol b-3b) is a 430 number average molecular weight, nominally difunctional poly(propylene oxide). Greater than 90% of its hydroxyl groups are secondary.

Polyol W is a ethylene oxide/propylene oxide copolymer containing 75% oxyethylene units. It has a hydroxyl equivalent weight of 1675 and 45% of its hydroxyl groups are primary.

Polyol X is an ethylene oxide-capped poly(propylene oxide) made by propoxylating and then ethoxylating a mixture of sucrose and glycerin. The oxyethylene content of Polyol X is below 30%. Polyol X has an average functionality of 4.7 and a hydrogen equivalent weight of about 1750. About 77% of the hydroxyl groups are primary.

Monol Z is a 500 molecular weight n-butanol initiated random copolymer of ethylene oxide and butylene oxide sold by The Dow Chemical Company as Synalox™ 50-15B.

Prepolymer A is made by reacting 9.5 parts of a 1675 equivalent weight, nominally trifunctional random copolymer of ethylene oxide and propylene oxide (45% primary hydroxyls) with 63.7 parts of a mixture of about 32.5% 2,4'-MDI, 1-2% 2,2'-MDI and the remainder 4,4'-MDI and 26.8 parts of a polymeric MDI having an isocyanate content of 31% and an isocyanate functionality of 2.7. Prepolymer A has an isocyanate content of about 29.5%.

Prepolymer B is made in the same manner as Prepolymer A, replacing the polyol with a like weight of Polyol b-1). Prepolymer B has an isocyanate content of about 29.5%.

Surfactant A is a silicone surfactant that has a hydroxyl equivalent weight of about 1145.

Surfactant B is a commercially available silicone surfactant.

Surfactant C is a commercially available silicone surfactant.

The Catalyst is a mixture of i) an N,N-bis(dimethylaminopropyl)amine catalyst product and ii) a (dimethylaminoethyl)ether catalyst.

All foams are made by formulating all starting materials except the polyisocyanates into a formulated polyol. The formulated polyol and polyisocyanates are processed through a Cannon A40 or A60 foam machine equipped with an FLP 14 or FLP 18 mixhead, at a throughput of 250-300 g/second. The temperatures of the components are 25° C. Component pressures are 160 atmospheres. The mold is a 32 liter pillow mold which is held at 45° C. throughout the curing process. The demold time is 5 minutes. The isocyanate index in each case is as indicated below.

EXAMPLES 1-2 AND COMPARATIVE SAMPLE A

These foams are made from the ingredients indicated in Table 1.

TABLE 1

| | Parts By Weight | | |
|---|---|---|---|
| Ingredient | Comp. A* | Ex. 1 | Ex. 2 |
| Polyol b-1 | 67.29 | 66.82 | 71.1 |
| Polyol b-2 | 27.3 | 27.1 | 16.8 |
| Polyol b-3a | 0 | 0 | 6.0 |
| Surfactant A | 0.28 | 0.18 | 0.2 |
| Surfactant B | 0.03 | 0 | 0 |
| Catalyst | 0.9 | 0.9 | 0.9 |
| Water | 4.2 | 5.0 | 5.0 |
| Prepolymer A | 60, 70 index | 60, 70 index | 60, 70 index |
| Equivalent ratio, b-1):(b-2) + b-3)) | 1.62 | 1.62 | 1.63 |

*Comparative.

Foam core density, recovery time, 90% compression set and 40% compression load deflection are measured for the resulting foams. Results are as indicated in Table 2.

TABLE 2

| Designation | Core Density, kg/m³ | Recovery time, s | 90% compression set, % | 40% CLD, kPa |
|---|---|---|---|---|
| Comp. A* (60 index) | 35.4 | 1-2 | 5.0 | 0.33 |
| Comp. A* (70 index) | 31.9 | 1-2 | 3.9 | 0.47 |
| Ex. 1 (60 index) | 29.7 | 2.7 | 4.3 | 0.31 |
| Ex. 1 (70 index) | 28.2 | 5.4 | 5.6 | 0.78 |
| Ex. 2 (60 index) | 29.3 | 2.9 | 7.7 | 0.34 |
| Ex. 2 (70 index) | 26.5 | 6.1 | 6.4 | 0.81 |

*Comparative.

Comparative Sample A shows the effect of using 4.2 parts water and an isocyanate index of 60 or greater. Recovery times and 90% compression sets are good, but foam densities are higher than are wanted.

Examples 1-2 demonstrate the desired combination of very low density (well below 30 kg/m³), extremely low compression set and recovery time of greater than 1 second. Little or no loss of load bearing (as indicated by the CLD measurement) is seen in relation to Comparative Sample A.

EXAMPLES 3-6 AND COMPARATIVE SAMPLE B

These foams are made from the ingredients indicated in Table 3. Foam properties are as indicated in Table 4.

TABLE 3

| | Parts by Weight | | | | |
|---|---|---|---|---|---|
| Ingredient | Comp. B* | Ex. 3 | Ex. 4 | Ex. 5 | Ex. 6 |
| Polyol b-1 | 76.2 | 75.6 | 76.2 | 76.2 | 75.1 |
| Polyol b-2 | 6.0 | 6.0 | 6.0 | 6.0 | 6.0 |
| Polyol b-3a | 12.5 | 12.5 | 12.5 | 12.5 | 12.3 |
| Surfactant A | 0.2 | 0.2 | 0.2 | 0.2 | 0.2 |
| Surfactant C | 0 | 0 | 0 | 0.05 | 0 |
| Catalyst | 0.9 | 0.9 | 0.9 | 0.9 | 0.9 |
| Water | 4.2 | 5.0 | 5.0 | 5.0 | 5.5 |
| Prepolymer A (index) | 66, 70 | 60, 70 | 0 | 60, 70 | 60, 70 |
| Prepolymer B (index) | 0 | 0 | 60, 70 | 0 | 0 |
| Prepolymer C (index) | 0 | 0 | 0 | 0 | 0 |
| Equivalent ratio, b-1):(b-2) + b-3)) | 1.63 | 1.64 | 1.63 | 1.63 | 1.63 |

*Comparative.

TABLE 4

| Designation | Core Density, kg/m³ | Recovery time, s | 90% compression set, % | 40% CLD, kPa |
|---|---|---|---|---|
| Comp. B* (66 index) | 34.2 | 1-5 | 6.0 | 0.54 |
| Comp. B* (70 index) | 34.0 | 1-5 | 6.0 | 0.72 |
| Ex. 3 (60 index) | 30.5 | 2.5 | 8.6 | 0.44 |
| Ex. 3 (70 index) | 28.8 | 2.5 | 3.5 | 0.92 |
| Ex. 4 (60 index) | 32.4 | 1-5 | 5.8 | 0.53 |
| Ex. 4 (70 index) | 32.8 | 1-5 | 7.1 | 0.85 |
| Ex. 5 (60 index) | 30.2 | 3.1 | 3.7 | 0.43 |

TABLE 4-continued

| Designation | Core Density, kg/m³ | Recovery time, s | 90% compression set, % | 40% CLD, kPa |
|---|---|---|---|---|
| Ex. 5 (70 index) | 29.2 | 3.5 | 13.8 | 0.95 |
| Ex. 6 (60 index) | 24.8 | 3.5 | 6.0 | 0.42 |
| Ex. 6 (70 index) | 24.4 | 3.5 | 8.6 | 0.94 |

*Comparative.

Very low compression sets are obtained at foam densities as low as 24.4 kg/m³, while retaining good viscoelastic character in the foams.

EXAMPLES 7 AND 8 AND COMPARATIVE SAMPLE C

These foams are made from the ingredients indicated in Table 5. Foam properties are as indicated in Table 6.

TABLE 5

| Ingredient | Comp. C* | Ex. 7 | Ex. 8 |
|---|---|---|---|
| Polyol b-1 | 78.7 | 77.55 | 82.15 |
| Polyol b-2 | 0 | 1 | 6 |
| Polyol b-3a | 16 | 15.35 | 0 |
| Polyol b-3b | 0 | 0 | 5.8 |
| Surfactant A | 0.2 | 0.2 | 0.15 |
| Catalyst | 0.9 | 0.9 | 0.9 |
| Water | 4.2 | 5.0 | 5.0 |
| Prepolymer A | 60 or 70 index | 60, 70 index | 60, 70 index |
| Equivalent ratio, b-1):(b-2) + b-3)) | 1.63 | 1.62 | 1.63 |

*Comparative.

TABLE 6

| Designation | Core Density, kg/m³ | Recovery time, s | 90% compression set, % | 40% CLD, kPa |
|---|---|---|---|---|
| Comp. C* | Not moldable even at 4.2 parts water | | | |
| Ex. 7 (60 index) | 30.2 | 2.5 | 5.0 | 0.45 |
| Ex. 7 (70 index) | 30.1 | 2.5 | 5.4 | 0.96 |
| Ex. 8 (60 index) | 30.5 | 1.4 | 5.2 | 0.53 |
| Ex. 8 (70 index) | 29.4 | 1.5 | 3.4 | 0.84 |

*Comparative.

Very low compression sets are obtained at low isocyanate index and low density in all cases.

Comparative Samples D and E

These foams are made from the ingredients indicated in Table 7. Foam properties are as indicated in Table 8.

TABLE 7

| | Parts By Weight | |
|---|---|---|
| Ingredient | Comp. D* | Comp. E* |
| Polyol b-1 | 61.39 | 67.5 |
| Polyol b-2 | 14 | 5.45 |
| Polyol b-3a | 0 | 10.95 |
| Polyol X | 10 | 10 |
| Monol Z | 10 | 0 |
| Surfactant A | 0.18 | 0.2 |
| Surfactant B | 0.03 | 0 |
| Catalyst | 0.65 | 0.9 |

TABLE 7-continued

| | Parts By Weight | |
|---|---|---|
| Ingredient | Comp. D* | Comp. E* |
| Water | 3.75 | 5.0 |
| Prepolymer A | 65, 70 index | 60, 72 index |
| Equivalent ratio, b-1):(b-2) + b-3)) | 2.884 | 1.635 |

*Comparative.

TABLE 8

| Designation | Core Density, kg/m³ | Recovery time, s | 90% compression set, % | 40% CLD, kPa |
|---|---|---|---|---|
| Comp. D* (65 index) | 40 | 2-3 | 66% at only 75% compression | 0.7 |
| Comp. D* (70 index) | 40 | 2-3 | 68% at only 75% compression | 0.9 |
| Comp. E* (60 index) | 31.2 | 12.5 | 85.6 | 0.45 |
| Comp. E* (72 index) | 29.8 | 8.1 | 85.9 | 0.95 |

*Comparative.

The presence of the ethylene oxide-capped polypropylene oxide) (Polyol X) is seen to cause compression sets to become very high in these foams, even at high foam densities, at all isocyanate indices evaluated.

EXAMPLES 9 AND 10

These foams are made from the ingredients indicated in Table 9. Foam properties are as indicated in Table 10.

TABLE 9

| Ingredient | Ex. 9 | Ex. 10 |
|---|---|---|
| Polyol b-1 | 64.1 | 64.1 |
| Polyol b-2 | 18.5 | 18.5 |
| Polyol W | 11.3 | 11.3 |
| Surfactant A | 0.2 | 0.2 |
| Catalyst | 0.9 | 0.9 |
| Water | 5.0 | 5.5 |
| Prepolymer A | 60, 70 index | 60, 70 index |

TABLE 10

| Designation | Core Density, kg/m³ | Recovery time, s | 90% compression set, % | 40% CLD, kPa |
|---|---|---|---|---|
| Ex. 9 (60 index) | 31.7 | 3.6 | 81.5 | 0.44 |
| Ex. 9 (70 index) | 30.0 | 3.7 | 4.8 | 0.69 |
| Ex. 10 (60 index) | 27.3 | 4.5 | 76.9 | 0.35 |
| Ex. 10 (70 index) | 25.6 | 5.6 | 5.5 | 0.72 |

These examples demonstrate that excellent results can be obtained even when the foam formulation contains a quantity of a component f) material (i.e., Polyol W). Excellent recovery times and good load bearing are obtained in all cases. When Polyol W is present, compression set suffers at the very low isocyanate index of 60, but very low compression sets are obtained when the index is raised to 70.

EXAMPLES 11 AND 12

These foams are made from the ingredients indicated in Table 11. Foam properties are as indicated in Table 12.

TABLE 11

| Ingredient | Ex. 11 | Ex. 12 |
|---|---|---|
| Polyol b-1 | 74.7 | 64.1 |
| Polyol b-2 | 6 | 18.5 |
| Polyol b-3 | 12.2 | 11.3 |
| Surfactant A | 0.2 | 0.2 |
| Catalyst | 0.9 | 0.9 |
| Water | 6.0 | 5.5 |
| Prepolymer A | 60, 70 index | 60, 70 index |

TABLE 12

| Designation | Core Density, kg/m$^3$ | Recovery time, s | 90% compression set, % | 40% CLD, kPa |
|---|---|---|---|---|
| Ex. 11 (60 index) | 25.5 | 4.0 | 6.2 | 0.45 |
| Ex. 11 (70 index) | 25.0 | 4.4 | 8.4 | 1.03 |
| Ex. 12 (60 index) | 22.4 | 3.3 | 6.0 | 0.37 |
| Ex. 12 (70 index) | 21.9 | 2.9 | 5.5 | 0.67 |

These examples demonstrate the very unusual and unexpected properties obtained in an extremely high (6 part) water formulation. Foam densities are as low as 21.9 kg/m$^3$, but compression set remains below 10% while good viscoelastic properties are obtained.

What is claimed is:

1. A flexible polyurethane foam having a) a core foam density of 20 to 33 kg/m$^3$, b) a 90% compression set of no greater than 10% as measured according to ISO 1856 method A and c) a recovery time of 0.5 to 20 seconds, wherein the flexible polyurethane is a reaction product of a reaction mixture comprising
 a) an aromatic polyisocyanate having an isocyanate content of 20 to 33% by weight, in an amount to produce an isocyanate index is 50 to 90; and
 b) polyethers comprising
 b-1) at least one polyether having a hydroxyl equivalent weight of 500 to 2000, a nominal hydroxyl functionality of 1 to 4, an oxyethylene content of 40 to 95% by weight, and at least 80% primary hydroxyl groups;
 b-2) at least one homopolymer or copolymer of propylene oxide, the at least one homopolymer or copolymer of propylene oxide having a hydroxyl equivalent weight of 600 to 2000, a nominal hydroxyl functionality of 1 to 6, and at least 80% secondary hydroxyl groups; and
 optionally b-3) at least one homopolymer or copolymer of propylene oxide, the at least one homopolymer or copolymer of propylene oxide b-3) having a hydroxyl equivalent weight of 80 to 599, a nominal hydroxyl functionality of 1 to 6, and at least 80% secondary hydroxyl groups;
 c) water;
 d) at least one catalyst for the reaction of an isocyanate group with an alcohol and/or water;
 e) at least one silicone foam-stabilizing surfactant; and
 optionally f) isocyanate reactive compounds different than components b), c), d), and e) in an amount of 0 to 5 weight percent, based on the combined weights of components b)-f),
 provided that the reaction mixture contains no more than 5 weight percent, based on the combined weight of components b)-f), of an ethylene oxide-capped poly(propylene oxide) polyol having an oxyethylene content of up to 30% based on the weight of the ethylene oxide-capped poly(propylene oxide) polyol, and
 wherein i) the ratio of hydroxyl equivalents provided by component b-1) to the hydroxyl equivalents provided by components b-2) and b-3) is 1 to 2.5, ii) component b-1) constitutes 65 to 85 weight percent of the combined weights of components b)-f); iii) component b-2) constitutes 1 to 30 weight percent of the combined weights of components b)-f), iii) component b-3) constitutes 0 to 20 weight percent to of the combined weights of components b)-f), and iv) the combined weight of components b-1), b-2) and b-3) constitute at least 70% of the combined weight of components b)-f); and wherein water is provided in an amount of 4.5 to 6.5 weight percent, based on the combined weight of components b)-f).

2. The flexible polyurethane foam of claim 1 wherein component b-3) constitutes 1 to 15 weight percent of the combined weights of components b)-f).

3. The flexible polyurethane foam of claim 1 wherein water constitutes at least 5 and up to 6.5 weight percent of the combined weight of components b)-f).

4. The flexible polyurethane foam of claim 1 wherein water constitutes 5.5 to 6 weight percent of the combined weight of components b)-f).

5. The flexible polyurethane foam of claim 1 wherein the reaction mixture contains no more than 5 weight percent of compounds having one or more primary and/or secondary amine groups, based on the combined weight of components b)-f).

6. The flexible polyurethane foam of claim 1 wherein the reaction mixture contains no more than 15 weight percent of a polyether polyol having an oxyethylene content of 50% or greater and in which fewer than 50% of hydroxyl groups are primary, based on the combined weight of components b)-f).

7. The flexible polyurethane foam of claim 1 wherein the reaction mixture contains no more than 1 weight percent of polyols having hydroxyl equivalent weights of 79 or less, based on the combined weight of components b)-f).

8. The flexible polyurethane foam of claim 1 wherein component a) includes an MDI product that contains up to 50 weight percent of the 2,4'-isomer and up to 5 weight percent of the 2,2'-isomer, the remainder being the 4,4'-isomer and/or a mixture thereof with PMDI.

9. The flexible polyurethane foam of claim 1 wherein component a) includes a urethane group-containing prepolymer made by reacting a polyol with MDI product that contains up to 50 weight percent of the 2,4'-isomer and up to 5 weight percent of the 2,2'-isomer, the remainder being the 4,4'-isomer, and/or a mixture thereof with PMDI.

10. The flexible polyurethane foam of claim 1 wherein the isocyanate index is 60 to 90.

11. The flexible polyurethane foam of claim 1 which has a core foam density of 20 to 30 kg/m$^3$.

12. The flexible polyurethane foam of claim 1 which has a core foam density of 20 to 28 kg/m$^3$.

* * * * *